No. 856,509. PATENTED JUNE 11, 1907.
M. C. BACON & M. BALDRIDGE.
COOKING UTENSIL.
APPLICATION FILED OCT. 17, 1905.

Witnesses:
Chester H. Roake
J. Townsend

Inventors
Mary C. Bacon.
May Baldridge.
By James R. Townsend
Their Attorney.

UNITED STATES PATENT OFFICE.

MARY C. BACON AND MAY BALDRIDGE, OF LOS ANGELES, CALIFORNIA.

COOKING UTENSIL.

No. 856,509.　　　Specification of Letters Patent.　　　Patented June 11, 1907.

Application filed October 17, 1905. Serial No. 283,086.

*To all whom it may concern:*

Be it known that we, MARY C. BACON and MAY BALDRIDGE, both citizens of the United States, residing at Los Angeles, in the county of Los Angeles and State of California, have invented a new and useful Cooking Utensil, of which the following is a specification.

An object of our invention is to provide improved means for cooking soft articles without destroying the form thereof, or in any wise breaking or injuring them when the same are boiled in water or other fluid.

An object of the invention is to provide improved means for cooking soft bodies, as for instance poached eggs in a superior manner by applying hot water to said bodies evenly around all edges while the body is supported on a surface that is likewise heated by the same body of water.

The utensil consists in a body in the form of an open ended vessel having a row of holes entirely around it a distance above the lower end and also having a way for a sliding bottom and a bottom to slide in such way.

Broadly considered, our invention relates to a cooking utensil adapted to be placed inside a receptacle in which water or other fluid is being heated; said utensil being provided with a horizontally-movable bottom and with walls perforated below the water level on a plurality of sides of the bottom.

Our invention comprises a plurality of receptacles each having a sliding bottom, there being an open space between said receptacles, and each of said receptacles having perforated sides.

In the following specification we have shown and described the device in two forms, in one of which one cooking receptacle is used, and in the other form two receptacles are used, but it is to be understood that more receptacles may be used if desired.

Figure 1:
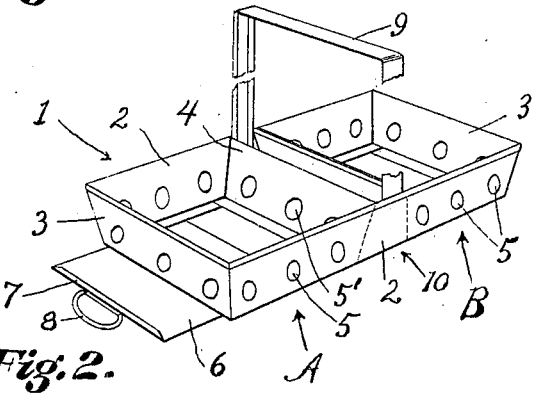
Figure 4:
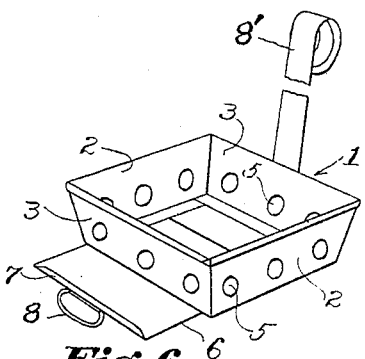
Figure 2:
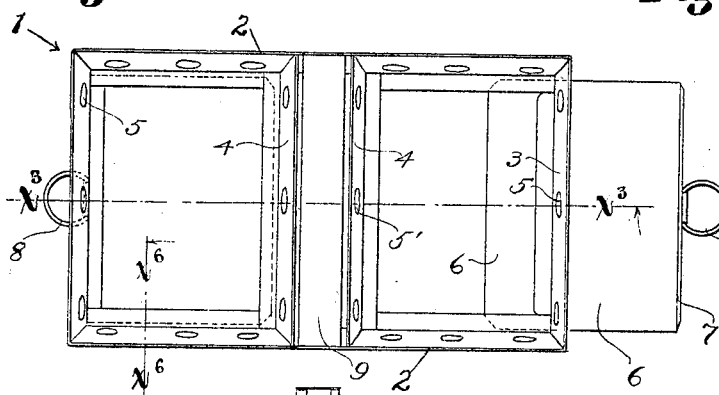
Figure 6:
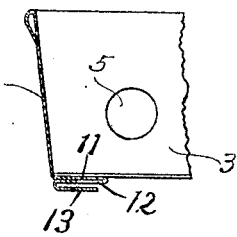
Figure 3:
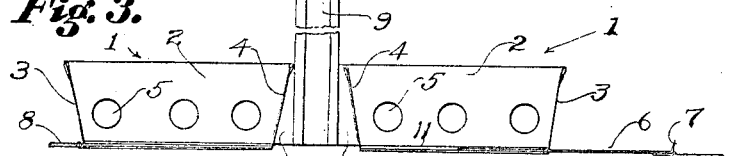
Figure 5:
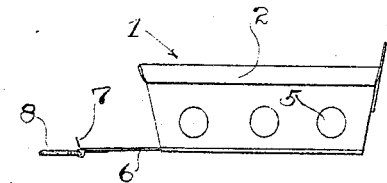
Figure 7:
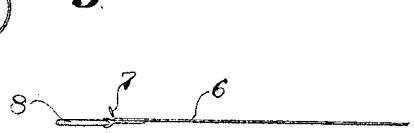

The accompanying drawings illustrate the invention:

Figure 1 is a perspective view of the device in one form thereof. Fig. 2 is a plan view of Fig. 1. Fig. 3 is a vertical section on line $x^3$—$x^3$, Fig. 2. Fig. 4 is a perspective view of a modified form of the device. Fig. 5 is a vertical mid-section of the same. Fig. 6 is an enlarged detail fragmental view of guiding means for the slidable bottom of the device. Fig. 7 is a longitudinal mid-section of said bottom.

The cooking utensil shown in Fig. 1, comprises two receptacles A, B, formed by frame 1 which includes side pieces 2, and end pieces 3 and 4 which may be made of sheet metal and fastened together by any suitable means.

5 designates perforations in the sides and outer ends of the device to allow free access of heated liquid to and from the article being cooked.

5' designates perforations through the inner end pieces 4.

The bottom 6 is desirably formed as a slide consisting of a single piece of sheet metal having an upturned flange 7 to limit the insertion of the slide, and a suitable handle or ring 8 for withdrawing and inserting the slide.

9 designates the main handle of the device which is desirably of considerable length and is preferably attached thereto between the two receptacles A, B, and directly above the middle compartment or laterally-inclosed space 10 formed between said receptacles A B.

The side walls 2 are each provided along the bottom with a suitable guide for the slides 6. Said guide preferably consists of a flange formed as a downward continuation of side pieces 2, said flange consisting of an inward extension 11 having a reversely-bent portion 12 and a final inward extension 13 to support the sliding bottom during movements thereof. The double bend of this flange makes a strong frame and provides a smooth guide for the movable bottom.

In the form of device having a two-part receptacle, each part is preferably provided with a bottom which can be withdrawn in the direction opposite the other part.

Figs. 4 and 5 show our improved cooking utensil formed as a single receptacle having a handle 8' extending upwardly from one side thereof, the slidable bottom 6 being removable from the side of the receptacle opposite from that to which the handle is attached.

We do not wish to be understood as limiting ourselves to any exact construction or size of receptacle. When designed to be used for the purpose of poaching eggs to be served on toast, each receptacle may be made approximately rectangular in shape, having a length somewhat greater than its width, and is desirably of a size adapted to substantially cover the piece of toast upon which the poached egg is to be placed.

The use of our device will be easily understood from the foregoing description.

In applying the poached egg to a piece of toast, the receptacle containing the egg should be placed squarely over and in close proximity to the piece of toast when the sliding bottom is withdrawn sufficiently to leave the egg in proper place and in unbroken condition upon the toasted bread.

The end pieces 3 toward which the flat bottom 6 slides as the same is wholly or partially withdrawn, form walls which operate as abutments to arrest articles carried by said bottom so that poached eggs, for example, may be deposited beneath the utensil upon toast or upon anything else over which the utensil is held while the bottom is being withdrawn.

Our device when used as a two-part receptacle having an intermediate compartment is especially adapted to be used on gasolene stoves and other heaters where the heat is mostly generated at a single point. In this case, the poacher should be placed into the container in which the fluid is being heated, with the middle compartment 10 over the hottest portion of the flame, so that the boiling water from that point will pass through the inner perforations 5' into each receptacle and will circulate therethrough thoroughly and evenly cooking the eggs or other article being cooked.

The two-part receptacle having the intermediate space between the perforated walls 4 is of especial advantage for poaching eggs in boiling water, as the boiling water, is made to pass continuously through the perforations of the inside walls 4 over the eggs which are thus cooked sufficiently on top before their bottom portion is overdone. The boiling water circulates freely over the eggs through the openings which are provided on all sides of the receptacles. Devices have been made for boiling vegetables in which the water is raised considerably above the surface and made to fall down with considerable force in a stream upon the article being cooked. Such an appliance has the disadvantage of applying the hot water too much to one spot and is liable to break the yolk of the egg owing to the force of the descending stream. By our invention a receptacle having walls perforated below the water line is provided whereby an even and gentle circulation of water is caused to enter adjacent the bottom of the receptacle, pass around and over the egg from all sides thereof to properly cook the same without danger of breaking the yolk.

What we claim is:—

1. A cooking utensil comprising a two-part receptacle each part having a slidable bottom movable in a direction opposite from the other part, there being a laterally inclosed intermediate space between each part of the receptacle and openings leading from said space into each part of the receptacle.

2. A cooking utensil comprising a plurality of receptacles, each receptacle having a horizontally-movable bottom, there being a laterally-inclosed intermediate space between the said receptacles, and openings leading from said space into said receptacles adjacent the bottom thereof.

In testimony whereof, we have hereunto set our hands at Los Angeles, California this 11th day of October 1905

MARY C. BACON.
MAY BALDRIDGE.

In presence of—
ALBERT H. MERRILL,
JULIA TOWNSEND.